United States Patent [19]

O'Donnell

[11] Patent Number: 5,718,191

[45] Date of Patent: Feb. 17, 1998

[54] PET CARRIER APPARATUS

[76] Inventor: Norman J. O'Donnell, 3 Andromeda Ct., Greenville, S.C. 29615

[21] Appl. No.: 664,700

[22] Filed: Jun. 17, 1996

[51] Int. Cl.$^6$ ..................................................... A01K 1/035
[52] U.S. Cl. ........................................................ 119/771
[58] Field of Search ................................. 119/28.5, 771, 119/792, 793, 907; 297/188.08, 188.09, 250.1, 256.15, 253

[56] References Cited

U.S. PATENT DOCUMENTS

| | | | |
|---|---|---|---|
| 3,310,034 | 3/1967 | Dishart | 119/28.5 |
| 5,136,981 | 8/1992 | Barreto, III et al. | 119/28.5 |
| 5,479,892 | 1/1996 | Edwards | 119/771 |
| 5,487,361 | 1/1996 | Dean | 119/28.5 |
| 5,551,373 | 9/1996 | O'Donnell | 119/771 X |

*Primary Examiner*—Thomas Price

[57] ABSTRACT

A pet carrier apparatus includes a receiver assembly which includes a longitudinal vertical plane. A connector assembly is connected to the receiver assembly such that one end of the connector assembly is connected to the receiver assembly on a first side of the longitudinal vertical plane and such that another end of the connector assembly is connected to the receiver assembly on a second side of the longitudinal vertical plane. A first tension strap is connected to the receiver assembly such that one end of the first tension strap is connected to the receiver assembly on the first side of the longitudinal vertical plane, and a second tension strap is connected to the receiver assembly such that one end of the second tension strap is connected to the receiver assembly on the second side of the longitudinal vertical plane. The connector assembly includes a first strap-receiving aperture in the receiver assembly, a second strap-receiving aperture in the receiver assembly, and a connector strap threaded through the two strap-receiving apertures. A tether assembly is connected to the connector strap, and the tether assembly is connected to a harness worn by a pet placed in the receiver assembly. A cover assembly covers the receiver assembly and has an elastic bottom edge for securing the cover assembly to the receiver assembly. The receiver assembly can also include a longitudinal groove located on a bottom side of the receiver assembly.

6 Claims, 3 Drawing Sheets

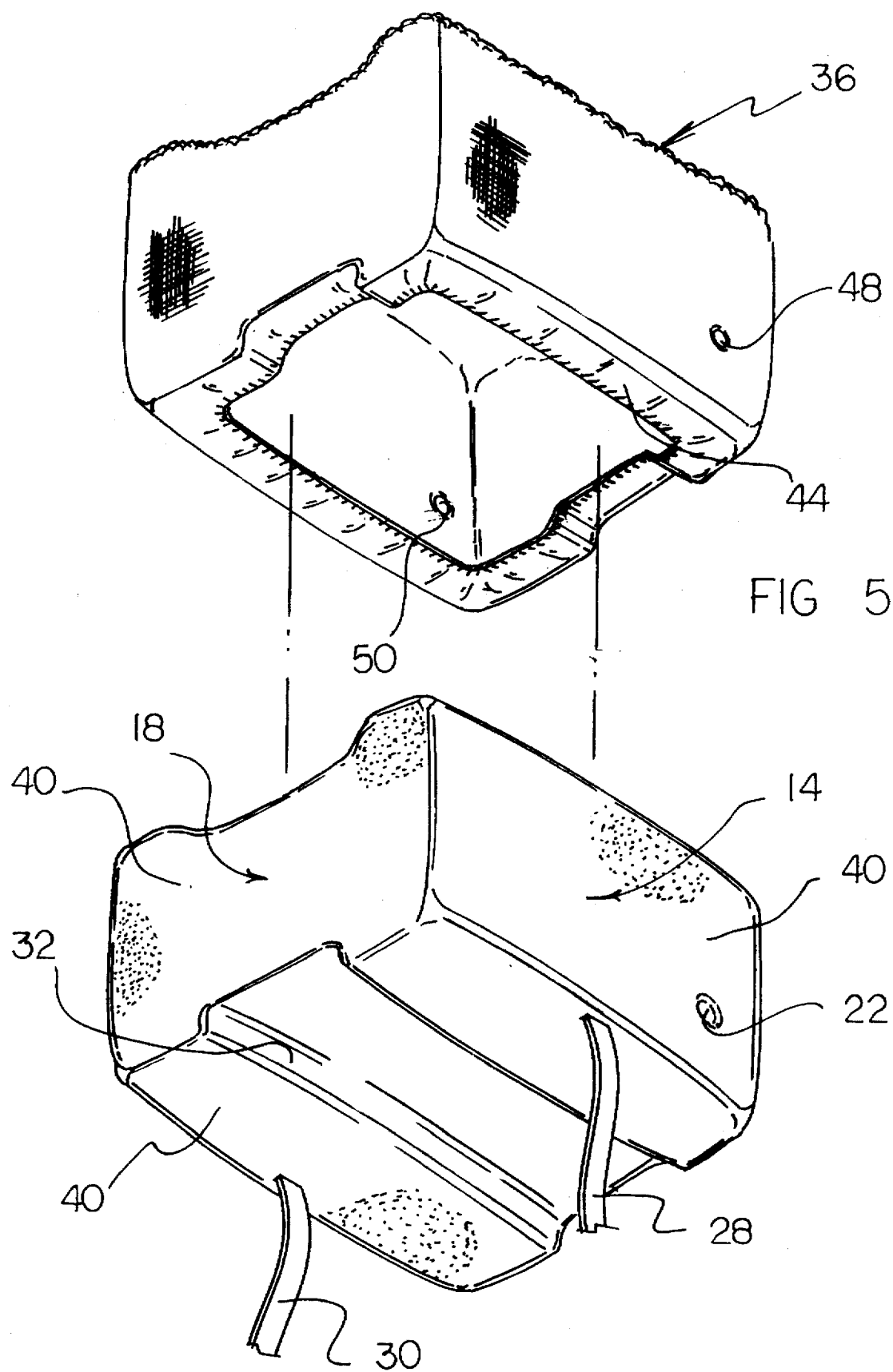

PET CARRIER APPARATUS

BACKGROUND OF THE INVENTION

1. Field of the Invention

The present invention relates generally to devices enabling a person to take a pet along on a wheeled vehicle and, more particularly, to a device especially adapted for carrying a pet on a two-wheeled vehicle.

2. Description of the Prior Art

Devices are well known in the art for carrying a pet in a four-wheeled vehicle. For example, a pet carrier that is used in a motor vehicle is disclosed in U.S. Pat. No. 5,044,321. More specifically, U.S. Pat. No. 5,044,321 discloses a restraining pouch that is suspended from two independent side-by-side seats. In addition, the following U.S. patents disclose some booster seats used for infants and toddlers in motor vehicles: 5,275,464; Des. 268,630; Des. 283,855; Des. 324,611; and Des. 348,783. It is noted that one particular characteristic of the human booster seats is common to all of the seats. A provision is made at the front of each seat for the legs of the infant or child to let the legs hang over the front of the seat. Such a feature may be useful for a human infant or toddler. However, for a booster seat that is used for a pet, such a provision is undesirable. If a pet is seated on a booster support, and the pet's front legs would move off of the top surface of the booster support, the pet would probably fall on its face. With this in mind, it would be desirable if a pet carrier device had a feature which prevents a pet's front legs from moving off of the top surface of the carrier.

As a matter of interest, U.S. Pat. No. 5,277,148 discloses a wearable pet enclosure which is not used as a booster seat in a motor vehicle.

Aside from four-wheeled vehicles, many person's desire to used two-wheeled vehicles such as bicycles and motorcycles. Yet, none of the prior art cited above discloses a pet carrier for carrying a pet on a two-wheeled vehicle.

A number of considerations may be important when considering a pet carrier for a two-wheeled vehicle. For example, to provide optimum stability for a two-wheeled vehicle, it would be desirable if a pet carrier were supported by the two-wheeled vehicle in such a way that the center of gravity of the pet and the pet carrier were located approximately along the longitudinal axis of the two-wheeled vehicle. In addition, to assure that the pet does not fall out of the pet carrier, it would be desirable if the pet were provided with a device to secure the pet to the carrier.

For a pet carrier that is carried by a two-wheeled vehicle, it is important that the pet carrier does not lilt to either side of the longitudinal axis of the two-wheeled vehicle. In this respect, it would be desirable if a pet carrier had means for preventing the pet carrier from tilting to either side of the longitudinal axis of the two-wheeled vehicle.

Any device that is often used for supporting a pet is subject to the accumulation of pet hair and other debris. In this respect, for convenience and sanitary purposes, it would be desirable if a pet carrier had an easily removable and easily laundered cover.

When a pet is taken on an overnight trip, the pet may not feel comfortable in sleeping in a new environment. For example, if a pet is accustomed to sleeping in a pet bed, the pet bed may not be available in the location slept in overnight. To avoid this problem, it would be desirable if a pet carrier were provided that can also serve as a portable pet bed.

Thus, while the foregoing body of prior art indicates it to be well known to use pet carriers for four-wheeled vehicles, the prior art described above does not teach or suggest a pet carrier apparatus which has the following combination of desirable features: (1) prevents a pet's front legs from moving off of the top surface of the carrier; (2) is used for carrying a pet on a two-wheeled vehicle; (3) is supported by a two-wheeled vehicle in such a way that the center of gravity of the pet and the pet carrier are located approximately along the longitudinal axis of the two-wheeled vehicle; (4) is provided with a device to secure the pet to the carrier; (5) has means for preventing the pet carrier from tilting to either side of the longitudinal axis of the two-wheeled vehicle; (6) has an easily removable and easily laundered cover; and (7) can serve as a portable pet bed. The foregoing desired characteristics are provided by the unique pet carrier apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a pet carrier apparatus which includes a receiver assembly which includes a longitudinal vertical plane. A connector assembly is connected to the receiver assembly such that one end of the connector assembly is connected to the receiver assembly on a first side of the longitudinal vertical plane and such that another end of the connector assembly is connected to the receiver assembly on a second side of the longitudinal vertical plane. A first tension assembly is connected to the receiver assembly such that one end of the first tension assembly is connected to the receiver assembly on the first side of the longitudinal vertical plane, and a second tension assembly is connected to the receiver assembly such that one end of the second tension assembly is connected to the receiver assembly on the second side of the longitudinal vertical plane.

The receiver assembly includes a base portion and a wall assembly projecting upward from the base portion. The base portion includes a rigid board. The wall assembly includes a first longitudinal wall and a second longitudinal wall projecting upward from the base portion. The first longitudinal wall is connected to the base portion on the first side of the longitudinal vertical plane, and the second longitudinal wall is connected to the base portion on the second side of the longitudinal vertical plane. A first transverse wall and a second transverse wall project upward from the base portion. The first transverse wall is connected to the base portion on the first side of the longitudinal vertical plane, and the second transverse wall is connected to the base portion on the second side of the base portion.

The first tension assembly is connected to the first longitudinal wall, and the second tension assembly is connected to the second longitudinal wall. The connector assembly includes a first strap-receiving aperture in the first longitudinal wall, a second strap-receiving aperture in the second longitudinal wall, and a connector strap threaded through the first strap-receiving aperture and the second strap-receiving aperture. A tether assembly is connected to the connector strap. The first tension assembly includes a first tension strap, and the second tension assembly includes a second tension strap. The first tension strap and the second tension strap are linked together by a bridge strap portion is connected between the first tension strap and the second tension strap. The first tension strap, the second tension strap, and the bridge strap portion are formed as a unified strap assembly.

A cover assembly, received by the receiver assembly, covers the receiver assembly. The cover assembly includes a first cover aperture placed in registration with the first strap-receiving aperture and a second cover aperture placed in registration with the second strap-receiving aperture. The cover assembly includes an elastic bottom edge for securing the cover assembly to the receiver assembly. The receiver assembly includes resilient foam materials.

The receiver assembly can also include a longitudinal groove located on a bottom side of the receiver assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet carrier apparatus which has all of the advantages of the prior art and none of the disadvantages.

It is another object of the present invention to provide a new and improved pet carrier apparatus which may be easily and efficiently manufactured and marketed.

It is a further object of the present invention to provide a new and improved pet carrier apparatus which is of durable and reliable construction.

An even further object of the present invention is to provide a new and improved pet carrier apparatus which is susceptible of a low cost of manufacture with regard to both materials and labor, and which accordingly is then susceptible of low prices of sale to the consuming public, thereby making such pet carrier apparatus available to the buying public.

Still yet a further object of the present invention is to provide a new and improved pet carrier apparatus which prevents a pet's front legs from moving off of the top surface of the carrier.

Still another object of the present invention is to provide a new and improved pet carrier apparatus that is used for carrying a pet on a two-wheeled vehicle.

Yet another object of the present invention is to provide a new and improved pet carrier apparatus which is supported by a two-wheeled vehicle in such a way that the center of gravity of the pet and the pet carrier are located approximately along the longitudinal axis of the two-wheeled vehicle.

Even another object of the present invention is to provide a new and improved pet carrier apparatus that is provided with a device to secure the pet to the carrier.

Still a further object of the present invention is to provide a new and improved pet carrier apparatus which has means for preventing the pet carrier from tilting to either side of the longitudinal axis of the two-wheeled vehicle.

Yet another object of the present invention is to provide a new and improved pet carrier apparatus that has an easily removable and easily laundered cover.

Still another object of the present invention is to provide a new and improved pet carrier apparatus which can serve as a portable pet bed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is an exploded perspective view of the embodiment of the invention shown in FIG. 2 with the removable cover removed.

DESCRIPTION OF THE PREFERRED EMBODIMENT

Figure 1:
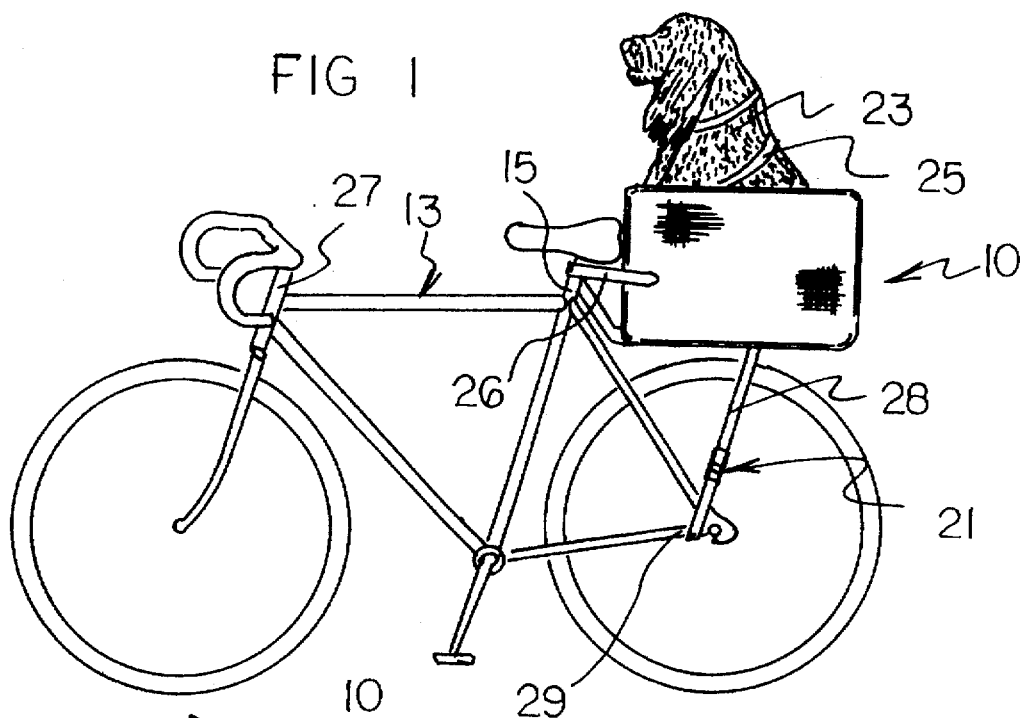
FIG. 1 is a side view showing a preferred embodiment of the pet carrier apparatus of the invention mounted on a bicycle with a dog seated in the pet carrier apparatus.
Figure 2:
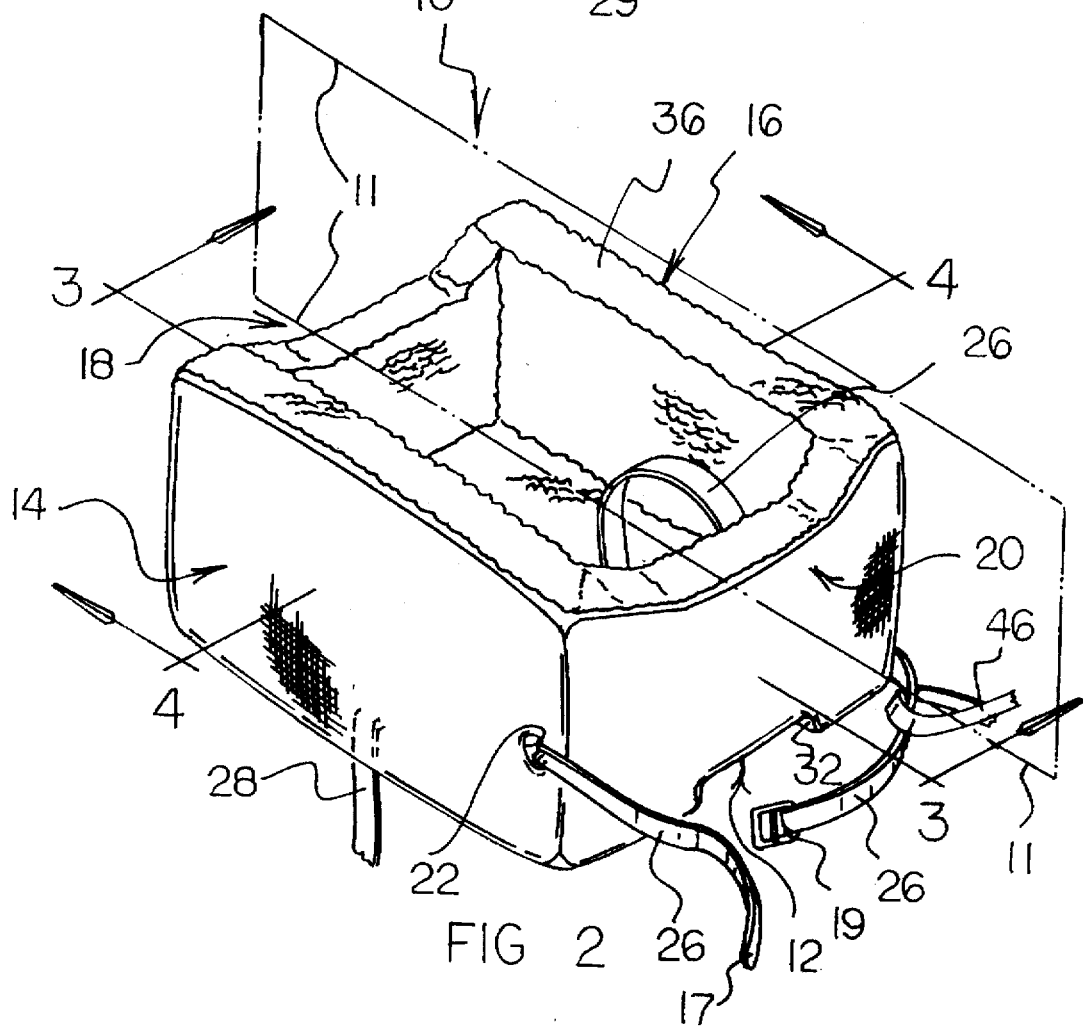
FIG. 2 is an enlarged perspective view of the embodiment of the pet carrier apparatus shown in FIG. 1 removed from the bicycle and with the dog absent from the pet carrier apparatus.

With reference to the drawings, a new and improved pet carrier apparatus embodying the principles and concepts of the present invention will be described.

Turning to FIGS. 1-5, there is shown an exemplary embodiment of the pet carrier apparatus of the invention generally designated by reference numeral 10. In its preferred form, pet carrier apparatus 10 includes a receiver assembly which includes a longitudinal vertical plane 11. A connector assembly is connected to the receiver assembly such that one end of the connector assembly is connected to the receiver assembly on a first side of the longitudinal vertical plane 11 and such that another end of the connector assembly is connected to the receiver assembly on a second side of the longitudinal vertical plane 11. A first tension assembly is connected to the receiver assembly such that one end of the first tension assembly is connected to the receiver assembly on the first side of the longitudinal vertical plane 11, and a second tension assembly is connected to the receiver assembly such that one end of the second tension assembly is connected to the receiver assembly on the second side of the longitudinal vertical plane 11.

The receiver assembly includes a base portion 12 and a wall assembly projecting upward from the base portion 12. The base portion 12 includes a rigid board 42. The rigid board 42 provides firm support for any pet that is received by the pet carrier apparatus 10 of the invention. The wall assembly includes a first longitudinal wall 14 and a second longitudinal wall 16 projecting upward from the base portion 12. The first longitudinal wall 14 is connected to the base portion 12 on the first side of the longitudinal vertical plane 11, and the second longitudinal wall 16 is connected to the base portion 12 on the second side of the longitudinal vertical plane 11. A first transverse wall 18 and a second transverse wall 20 project upward from the base portion 12. The first transverse wall 18 is connected to the base portion 12 on the first side of the longitudinal vertical plane 11, and the second transverse wall 20 is connected to the base portion 12 on the second side of the base portion 12.

The first tension assembly is connected to the first longitudinal wall 14, and the second tension assembly is connected to the second longitudinal wall 16. The connector assembly includes a first strap-receiving aperture 22 in the first longitudinal wall 14, a second strap-receiving aperture 24 in the second longitudinal wall 16, and a connector strap 26 threaded through the first strap-receiving aperture 22 and the second strap-receiving aperture 24. A tether assembly 46 is connected to the connector strap 26. The first tension assembly includes a first tension strap 28, and the second tension assembly includes a second tension strap 30. The first tension strap 28 and the second tension strap 30 are linked together by a bridge strap portion 34 is connected between the first tension strap 28 and the second tension strap 30. The first tension strap 28, the second tension strap 30, and the bridge strap portion 34 are formed as a unified strap assembly.

A cover assembly 36, received by the receiver assembly, covers the receiver assembly. The cover assembly 36 is removable, replaceable, and launderable. The cover assembly 36 includes a first cover aperture 48 placed in registration with the first strap-receiving aperture 22 and a second cover aperture 50 placed in registration with the second strap-receiving aperture 24. The cover assembly 36 includes an elastic bottom edge 44 for securing the cover assembly 36 to the receiver assembly. The receiver assembly includes resilient foam materials 40. The cover assembly 36 is placed over the resilient foam materials 40. The cover assembly 36 can be made from terry cloth materials.

The receiver assembly includes a longitudinal groove 32 located on a bottom side of the receiver assembly. More specifically, the longitudinal groove 32 is located on the bottom side of the base portion 12 of the receiver assembly.

In using the pet carrier apparatus 10 of the invention, a number of uses are contemplated. First, referring to FIG. 1, is the use of the pet carrier apparatus 10 as a pet carrier on a two-wheeled vehicle such as bicycle 13. Normally, the bicycle 13 includes a horizontally oriented carrier (partially shown in FIG. 1 extending from the seat post 15 and beneath the invention 10) which is positioned over the rear fender or wheel of the bicycle 13. The longitudinal groove 32 of the base portion 12 readily fits over such a carrier. The connector strap 26 is threaded through the first cover aperture 48, first strap-receiving aperture 22, the second strap-receiving aperture 24, and the second cover aperture 50. Ends of the connector strap 26 are arranged around the seat post 15 of the bicycle 13. The connector strap 26 includes a free strap end 17 and a buckle 19. The free strap end 17 is threaded through the buckle 19, and the free strap end 17 is pulled tight. Then, the free strap end 17 is secured to the buckle 19. In this way, the pet carrier apparatus 10 is initially secured to the bicycle 13.

In addition, the first tension strap 28 is secured to the first side of the bicycle 13, and the second tension strap 30 is secured to the second side of the bicycle 13. More specifically, the free end of the first tension strap 28 can be secured to one side portion of the rear fork 29 of the bicycle 13, and the free end of the second tension strap 30 can be secured to the other side portion of the rear fork of the bicycle 13. Each of the first tension strap 28 and the second tension strap 30 includes a respective length adjustment assembly 21 for adjusting the respective length, and thus the tension, of the respective tension straps. The first tension strap 28 and the second tension strap 30 further secure the pet carrier apparatus 10 to the bicycle 13. In addition, the first tension strap 28 and the second tension strap 30 restrain the pet carrier apparatus 10 from leaning to either the first side of the second side of the bicycle 13.

A pet, such as dog 23, is provided with a harness 25. The harness 25 is connected to the connector strap 26 using a tether assembly 46 (see FIG. 2). In this way, the dog 23 can be restrained from falling out of or jumping out of the pet carrier apparatus 10.

Figure 3:
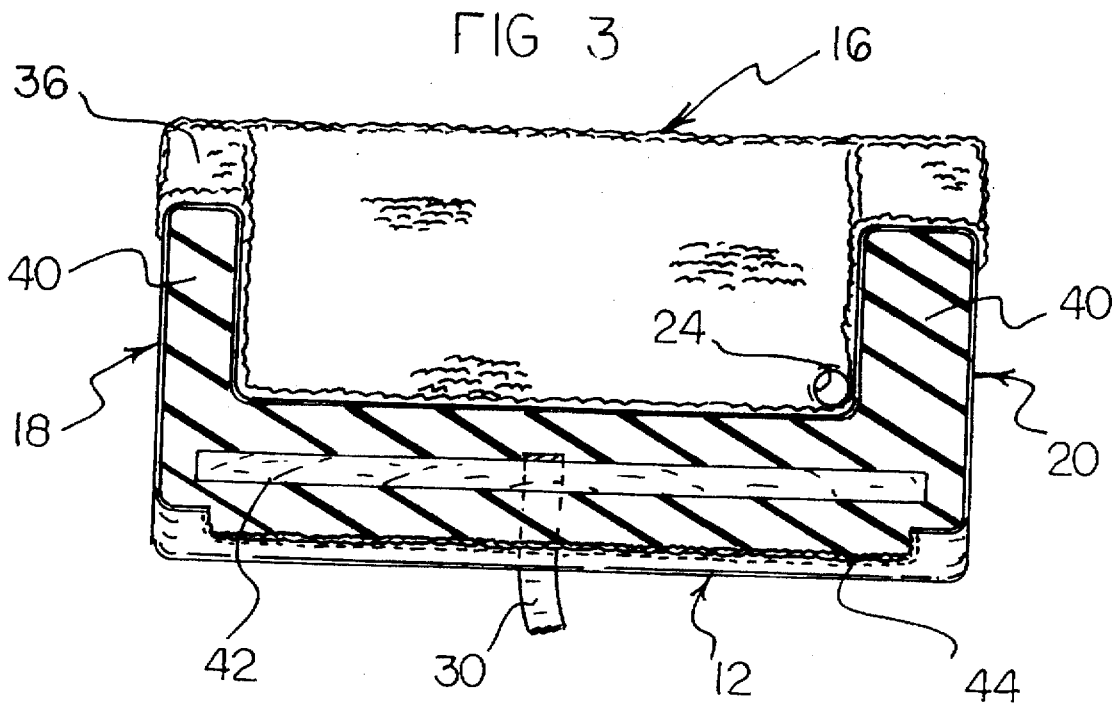
FIG. 3 is a cross-sectional view of the embodiment of the pet carrier apparatus of FIG. 2 taken along line 3—3 thereof.
Figure 4:
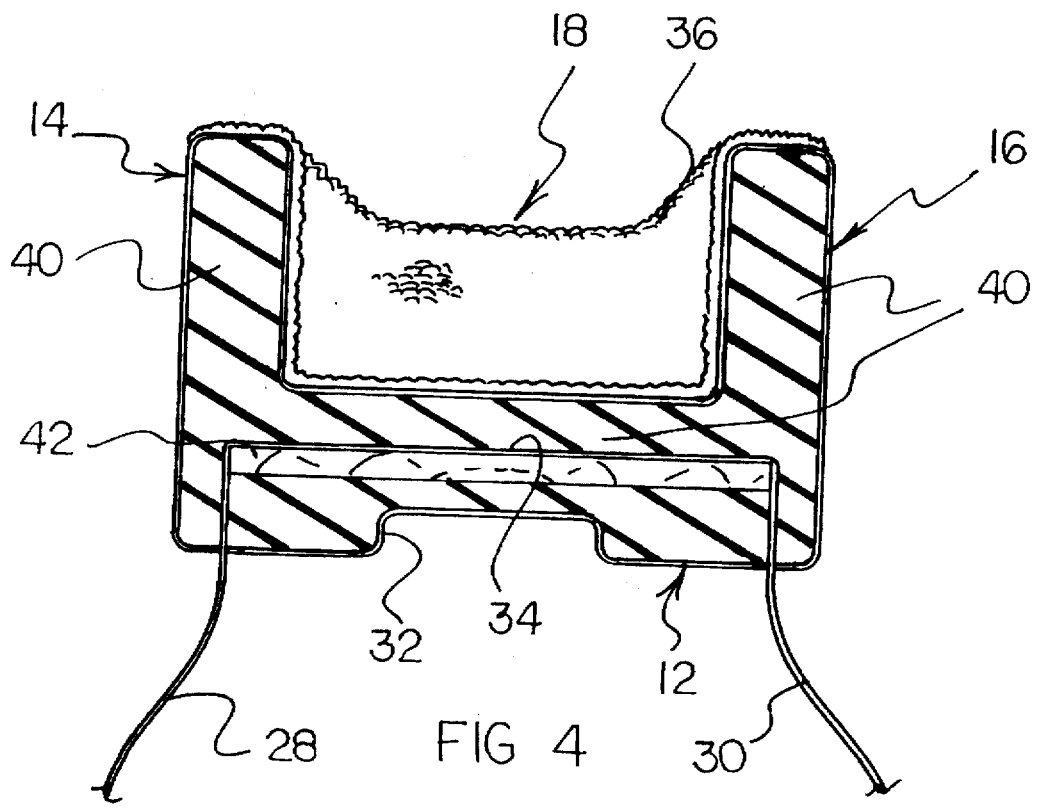
FIG. 4 is a cross-sectional view of the embodiment of the pet carrier apparatus of FIG. 2 taken along line 4—4 thereof.

The cover assembly 36 can be removed from the pet carrier apparatus 10 by removing the connector strap 26 from the first cover aperture 48 and the second cover aperture 50. The cover assembly 36 can be easily pulled off of the receiver assembly by stretching the elastic bottom edge 44 of the cover assembly 36. Once laundered, the cover assembly 36 can easily be replaced on the receiver assembly by stretching the elastic bottom edge 44 over the receiver assembly until it reaches the bottom side of the base portion 12. Then, the elastic bottom edge 44 is released and secured to the receiver assembly as shown in FIG. 3.

The pet carrier apparatus 10 of the invention can also be mounted on a front portion of the bicycle 13, such as a front carrier portion of the bicycle 13. When the pet carrier apparatus 10 is mounted on the front portion of the bicycle 13, the connector strap 26 can be secured around the handle bar post 27.

The pet carrier apparatus 10 of the invention can be used in still another way, that is, as a bed for the pet. This use can be carried out when the pet carrier apparatus 10 is removed from the bicycle 13.

The components of the pet carrier apparatus of the invention can be made from inexpensive and durable metal, plastic, leather, and cloth materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved pet carrier apparatus that is low in cost, relatively simple in design and operation, and which may advantageously be used to prevent a pet's front legs from moving off of the top surface of the carrier. With the invention, a pet carrier apparatus is provided which is used for carrying a pet on a two-wheeled vehicle. With the invention, a pet carrier apparatus is provided which is supported by a two-wheeled vehicle in such a way that the center of gravity of the pet and the pet carrier are located approximately along the longitudinal axis of the two-wheeled vehicle. With the invention, a pet carrier apparatus is provided which is provided with a device to secure the pet to the carrier. With the invention, a pet carrier apparatus is provided which has means for preventing the pet carrier from tilting to either side of the longitudinal axis of the two-wheeled vehicle. With the invention, a pet carrier apparatus is provided which has an easily removable and easily laundered cover. With the invention, a pet carrier apparatus is provided which can serve as a portable pet bed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A pet carrier apparatus comprising:
    a horizontally oriented carrier which can be secured to a seat post of a bicycle and positioned over a rear wheel of the bicycle;
    a base portion having first and second longitudinal sides, the base portion being positioned upon the horizontally oriented carrier;
    a first longitudinal wall projecting upward from the first longitudinal side of the base portion;
    a second longitudinal wall projecting upward from the second longitudinal side of the base portion;
    a pet harness connected relative to the base portion for securing a pet relative to the base portion,
    further comprising:
    a bicycle having a seat post, a rear fork, and a rear wheel connected to the rear fork, the horizontally oriented carrier being secured to the seat post and positioned over the rear wheel of the bicycle.

2. The pet carrier apparatus of claim 1, and further comprising:
    a connector strap secured relative to the base portion and secured about the seat post;
    a first tension strap mounted relative to the base portion and secured to the rear fork;
    a second tension strap mounted relative to the base portion and secured to the rear fork.

3. The pet carrier apparatus of claim 1, and further comprising a removable cover assembly removably positioned over the base portion and the longitudinal walls.

4. A pet carrier apparatus for use with a bicycle having a horizontally oriented carrier, said pet carrier apparatus comprising:
    a base portion having first and second longitudinal sides, a front edge, a rear edge, and a bottom side, the bottom side of the base portion being shaped to define a longitudinal groove extending along the bottom portion and into contiguous communication with the front edge of the bottom portion for receiving the horizontally oriented carrier of the bicycle;
    a first longitudinal wall projecting upward from the first longitudinal side of the base portion;
    a second longitudinal wall projecting upward from the second longitudinal side of the base portion;
    a pet harness connected relative to the base portion for securing a pet relative to the base portion,
    further comprising:
    a connector strap secured relative to the base portion and securable about a seat post of the bicycle;
    a first tension strap mounted relative to the base portion and securable to a rear fork of the bicycle;
    a second tension strap mounted relative to the base portion and securable to the rear fork of the bicycle.

5. The pet carrier apparatus of claim 4, and further comprising a removable cover assembly removably positioned over the base portion and the longitudinal walls.

6. A pet carrier apparatus comprising:
    a base portion having first and second longitudinal sides, the base portion being positioned upon the horizontally oriented carrier;
    a first longitudinal wall projecting upward from the first longitudinal side of the base portion;
    a second longitudinal wall projecting upward from the second longitudinal side of the base portion;
    a pet harness connected relative to the base portion for securing a pet relative to the base portion;
    a removable cover assembly, the cover assembly being removably positioned over the base portion and the longitudinal walls,
    wherein the first longitudinal wall is shaped to define a first strap-receiving aperture directed therethrough, and the second longitudinal wall is shaped to define a second strap-receiving aperture directed therethrough, and the cover assembly includes a first cover aperture placed in registration with the first strap-receiving aperture and a second cover aperture placed in registration with the second strap-receiving aperture;
    and further comprising a connector strap threaded through the first cover aperture, the first strap-receiving aperture, the second cover aperture, and the second strap-receiving aperture, the connector strap being securable about a seat post of the bicycle.

* * * * *